Figure 1:
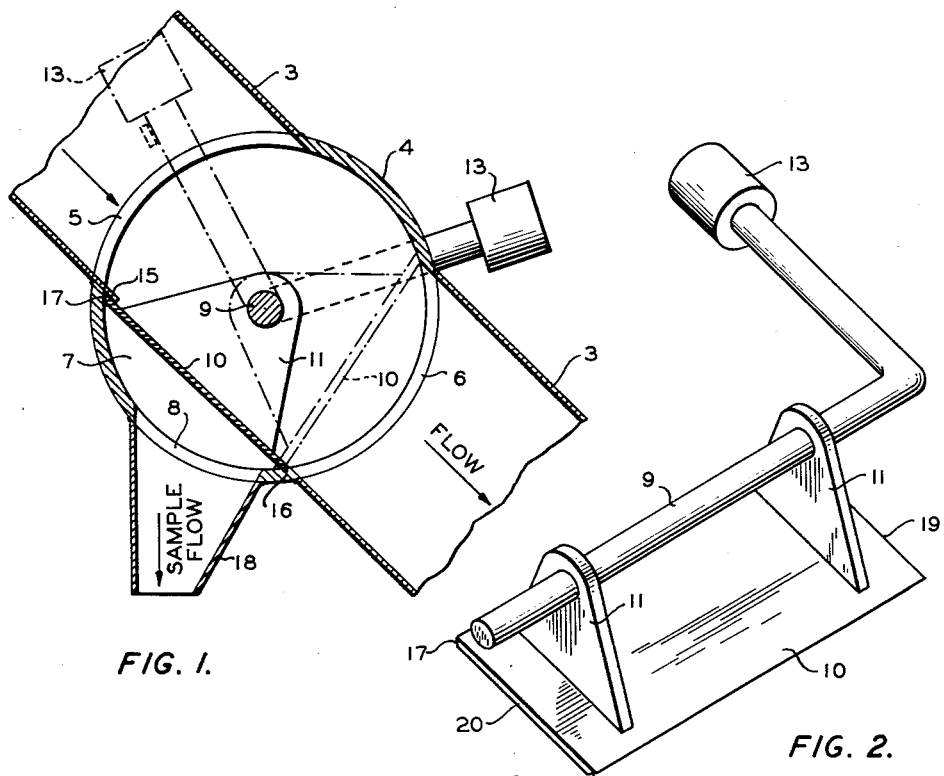

Oct. 31, 1961   R. R. THOMPSON ET AL   3,006,367

VALVE

Filed Sept. 26, 1957

INVENTORS.
E. W. BRASCH, JR.
R. R. THOMPSON

BY

ATTORNEYS.

United States Patent Office 3,006,367
Patented Oct. 31, 1961

3,006,367
VALVE
Ralph R. Thompson, Pasadena, and Edgar W. Brasch, Jr., Borger, Tex., assignors to Phillips Petroleum Company, a corporation of Delaware
Filed Sept. 26, 1957, Ser. No. 686,338
3 Claims. (Cl. 137—610)

This invention relates to a valve. In one of its aspects, the invention relates to a valve especially adapted to conveying and periodically sampling solid particulate material, the valve comprising a pivotally-mounted plate member disposed within a cylindrical valve body, which body in turn is disposed within a rectangular-shaped pipe or duct, the valve body being in open communication with the upstream and downstream ends of said duct and with the outside of said duct and valve body and said duct being in open communication with the inside of said valve body and its communication with the outside. In another one of its aspects, the invention provides a pivotally-mounted valve plate member which is chamfered or beveled and is rotatably or pivotally operated to scrape the inside of the said valve body.

In the art of conveying particulate solids and sampling the same or otherwise directing or redirecting flow of such solids, valves are, of course, necessary. These valves are subject to considerable erosion as well as sticking due to the fact that fines or smaller-sized particulate solids find their way into spaces between members of the valve which move relative each to the other. These particulate solids act to wedge the valve as well as to considerably erode the same.

It is an object of this invention to provide a valve. It is a further object of this invention to provide a valve suited for conveying particulate solids which tend to cause valves ordinarily in use to stick or to considerably erode. A further object of the invention is to provide a valve which can be used for conveying solids as well as fluids such as liquids or even gases.

Other aspects, objects and the several advantages of the invention are apparent from a study of the foregoing disclosure, the drawing and the claims appended hereto.

According to this invention, there is provided a pivotally-mounted plate which subtends an arc or a cylindrical body within which it is mounted, the said body being in turn incorporated within a substantially rectangular duct or pipe. A portion of the wall of the valve body which is comprised within the duct at the upstream and downstream ends of the duct at its juncture with said valve body is removed to provide for flow through the body of the valve. Also, a portion of the duct passing through the valve body is removed to provide for communication from within the valve body, and, therefore, from within the duct, to the outside of both the duct and the valve body.

Figure 2:
Figure 3:
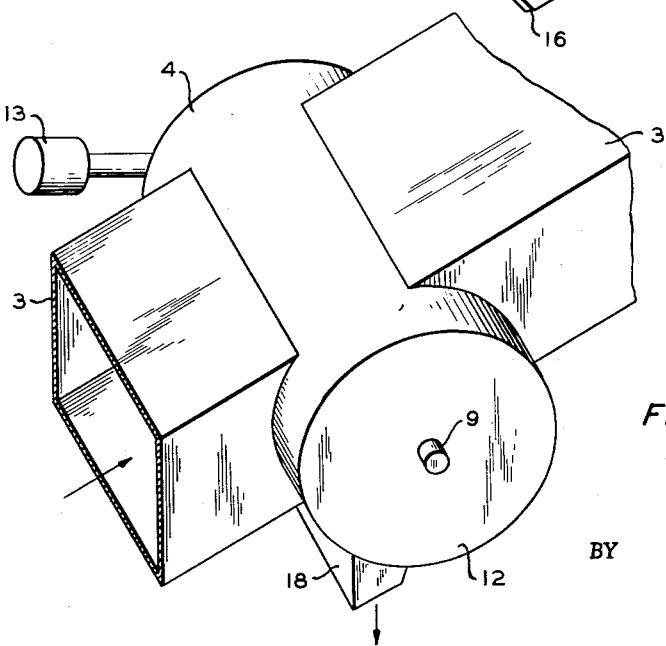

In the drawings, FIGURE 2 shows a specific form of valve plate. FIGURE 1 is an elevational cross-section of a pipe into which there has been embodied a valve according to the invention. FIGURE 3 is an isometric view of the valve of the invention as it appears in combination with a pipe.

Referring now to the drawings, in which like numbers refer to identical elements or members, 3 is a pipe or duct through which a flow of particulate solids, such as carbon black, is passed. Disposed in pipe 3 at right angles to its axis is a segment of pipe 4. Pipe 4, which is closed at its ends, is welded into pipe 3, in cross-fashion, and at this stage would, of course, block flow in pipe 3. However, according to the invention, pipe 4 is cut open at both the upstream and downstream portions of its wall which is contained wholly within pipe 3. Thus, absent any further elements, there is provided uninterrupted substantially straight line flow through pipe 3. Furthermore, a lower portion of the wall of pipe 3 entirely within pipe 4 is cut open to provide for uninterrupted flow from pipe 3 into that portion of pipe 4 which is without the space enclosed by pipe 3. Finally, pipe 4 is cut open, at a lower portion thereof to provide communication with space outside of the entire pipes and valve combination. The openings to which reference has been made are, in order discussed, indicated at 5, 6, 7 and 8. There is pivotally mounted on shaft 9 a valve plate 10. Plate 10 is fixed to shaft 9 by means of web-shaped plates 11. Shaft 9 extends to the outside of pipe 4 at its closed ends 12. Plate 10 can be pivoted by means of weighted lever 13. At the junctures of pipes 3 and 4, specifically at 15, there is provided a protrusion or lip element against which abuts the end of plate 10. This lip forms a part of pipe 4 and is provided by offsetting the aperture or opening 7. This lip seals with plate 10 sufficiently that solids will flow from pipe 3 onto plate 10. Plate 10 at its ends 16 and 17 is chamfered or beveled and when swinging about shaft 9 will scrape clean any portion of the body of pipe 4 against which it moves.

It is especially to be observed that the specific design or configuration of the valve of the invention precludes sticking or undue wear of elements thereof between which there is relative motion since accumulation of particles of solids or fines is prevented by means of the scraping or cleaning action of the valve.

When the weighted lever or arm 13 is swinging to the position indicated by the dashed lines, flow through pipe 3 is stopped or blocked and a sample of solids flowing in the valve will be obtained through opening 8 and discharge pipe 18.

Although the valve body and plate, etc. are now preferably made of metal which has given good service, it will be obvious to one skilled in the art in possession of this disclosure that one or more or all of the valve body or pipes can be coated with a non-metallic material such as a plastic material. For example, for some uses, the parts can be coated or even made of a plastic material such as polyethylene. A rigid polyethylene, now available under the trademark "Marlex," is especially well suited for use as here indicated. Still further, although the valve is especially adapted to insertion into pipes through which flows of particulate solids are handled, it is within the scope of the invention to adapt the valve to the flow of muds, clays, etc. or even liquids. Thus, the sampling of clay and oil suspension in clay-treating can be effected using a valve as here set forth and described. When complete liquid-tight seals are required, plate 10 can be made of somewhat elastic plastic or rubber-like material and selected of size such that ends 16, 17, 19 and 20 are in frictional engagement with the body of pipe 4, at least in closed or non-sampling position.

Although the valve is shown as a sampling valve, it can be adapted for other flow-stopping or diverting uses.

Example

A high abrasion furnace carbon black known in the trade as Philblack "O" is passed through a mill. On its way from the mill in which it has been milled to a desired degree of compactness, a sample is taken through the valve above-described. The sample is quickly obtained without upsetting significantly the flow in pipe 3.

This valve has been found to possess especially interesting application in carbon black plants in which it has been used for several months. The lines 3 in which the valves were placed were 8 inches by 12 inches and made of stainless steel. A piece of 10 inch carbon steel pipe 16 inches long was used for the body part 4 of the valve. The ends 12 of the pipe were enclosed and the shaft 9 was made of stainless steel. The opening 8 was cut 3 inches by 12 inches. The openings 5 and 6 were made 8 inches by 12 inches. The valve gate 10 was also 7¾ inches by 16 inches. The sample spout was made of stainless steel and the discharge opening was 3 inches wide and 5 inches long. The opening 8 into the discharge spout was 3 inches by 12 inches. Carbon black pellets flowed through conduit 3 at the rate of about 20 cubic feet per hour.

Reasonable variation and modification are possible within the scope of the foregoing disclosure, drawing and the appended claims to the invention, the essence of which is that there has been provided a valve comprising a plate valve member pivotally-mounted in a cylindrical valve body disposed at right angles to the axis of a pipe, substantially as set forth and herein described.

We claim:

1. A flow conduit comprising, in combination, a rectangular valve plate pivotally mounted on a shaft within a cylindrical valve body having an inlet opening, an outlet opening, and a discharge opening, a first rectangular pipe having its longitudinal axis at right angles with the axis of said valve body in register with said inlet opening, a second rectangular pipe having its longitudinal axis at right angles with the axis of said valve body in register with said outlet opening, an actuating element in cooperating relationship with said plate fixed to said shaft from without said valve body, said plate being of sufficient size to block flow through said outlet opening in one position of said plate and through said discharge opening in another position of said plate, said plate in cross section being positioned along and having a dimension substantially equal to a cord of a circular cross section of said cylindrical valve body, thereby being adapted to produce a scraping action on said valve body as it is moved therein, said first pipe having an extension forming a substantially linear lip at said inlet opening against which lip said plate abuts when in position to block flow through said discharge opening, said plate in said latter position forming a continuation of a wall of said first pipe and the corresponding wall of said second pipe.

2. A valve comprising, in combination, a cylindrical valve body having an inlet opening, an outlet opening, and a discharge opening between said inlet and outlet openings, the normal projections of said inlet and outlet openings on a plane through the axis of said body and equally spaced between said inlet and outlet openings, forming a single rectangle, one edge of said inlet opening parallel to said axis being spaced from the corresponding edge of said outlet opening by a distance substantially equal to the chordal dimension of said openings, a rectangle valve plate mounted on a shaft within said body, said shaft being coaxial with said body, an actuating element operatively connected with said shaft from without said body, said plate being offset from said axis sufficiently to close, in the first position, said outlet opening and in the second position, to span said distance between said edges thereby closing said discharge opening, said plate being positioned to the circular cross section of said body as a chord thereof and having a dimension along said chord substantially equal thereto, thereby being adapted to obtain a scraping action with respect to said valve body as it is moved therein whereby said plate in said first position permits flow through said inlet and outlet openings but not through said discharge opening, and in said second position permits flow through said discharge opening but not through said inlet and outlet openings.

3. A valve according to claim 2 wherein said inlet opening is provided with a substantially linear lip parallel with said shaft against which lip said plate abuts when in position to block flow through said discharge opening whereby said plate is located in said second position.

References Cited in the file of this patent

UNITED STATES PATENTS

| | | |
|---|---|---|
| 109,906 | Hutson | Dec. 6, 1870 |
| 156,087 | Higgs | Oct. 20, 1874 |
| 1,320,627 | Long | Nov. 4, 1919 |
| 1,448,941 | Powell | Mar. 20, 1923 |
| 1,621,022 | Merchen | Mar. 15, 1927 |
| 1,918,927 | Otto | July 18, 1933 |
| 2,516,510 | Fantz | July 25, 1950 |
| 2,530,295 | Fantz | Nov. 14, 1950 |

FOREIGN PATENTS

| | | |
|---|---|---|
| 4,077 | France | of 1905 |